3,645,915
STABILIZED NICKEL OXIDE-NICKEL CHROMITE REFORMING CATALYST
Alvin B. Stiles, Wilmington, Del., assignor to E. I. du Pont de Nemours and Company, Wilmington, Del.
No Drawing. Filed Apr. 20, 1970, Ser. No. 30,257
Int. Cl. B01j *11/06*
U.S. Cl. 252—462                                     5 Claims

ABSTRACT OF THE DISCLOSURE

A nickel oxide-nickel chromite catalyst stabilized with the oxides of lanthanum or uranium is useful in the steam reforming of hydrocarbons. The catalyst can optionally contain other oxides as promoters, e.g. manganese oxide, magnesium oxide, cerium oxide and rare earth oxides.

BACKGROUND OF THE INVENTION

Catalytic steam-hydrocarbon reforming is the major method employed by industry for producing hydrogen and synthesis gas mixtures. In this process gaseous hydrocarbons, such as methane and ethane, or hydrocarbons which may be vaporized at moderate temperatures, such as propane, butane, and normally liquid hydrocarbons up to and including heptane and octane are reacted with steam over a nickel catalyst at 650°–1000° C. to produce carbon oxides and hydrogen. The primary reaction products are then processed further in various ways, depending on the final use for the hydrogen and on the purity required.

Thus when the hydrogen is used for ammonia synthesis gas production, air is added in a secondary reforming step over a nickel catalyst where the oxygen is consumed in partial oxidation and reforming of the residual unreacted hydrocarbons. The nitrogen in the air provides the nitrogen required in the ammonia synthesis gas. For methanol synthesis gas, the primary reaction product is cooled and carbon dioxide may or may not be removed to produce the mixture required. For high-purity hydrogen, the primary reaction product is reacted catalytically with additional steam to oxidize carbon monoxide to carbon dioxide. The carbon dioxide is then removed and finally the residual carbon monoxide is hydrogenated to methane to produce high-purity hydrogen.

The catalysts which are commercially available for use in manufacturing plants using the steam hydrocarbon reforming process generally contain 10 to 50% nickel oxide mixed with a refractory, usually alumina and a cement such as calcium aluminate. The catalyst is generally pelleted into cylinders 0.5 or 0.75 inch in diameter and length, or as Raschig rings of similar size. These pellets or rings are placed in tubes located in a heating furnace. The hydrocarbon stream and steam are then passed through the heated tubes to produce hydrogen and carbon oxides.

While in use, the catalysts presently used are subject to loss of activity and disintegration resulting in unacceptable pressure drop caused by the plugging of the catalyst tubes. Such catalyst failures are very costly since generally a long shutdown is necessary to remove and to recharge the catalyst.

SUMMARY OF THE INVENTION

I have discovered a catalyst particularly useful in the reforming operation. This catalyst is composed of nickel oxide, nickel chromite, and a stabilizer selected from lanthanum oxide or uranium oxide. Optionally the catalyst can contain other materials as co-promoters, e.g., cerium oxide, thorium oxide, magnesium oxide, manganese oxide, or rare earth oxides.

The catalyst of the invention, exclusive of the support, comprises 10 to 100 parts nickel oxide (NiO), 5 to 100 parts nickel chromite ($Ni_2Cr_2O_5$) and 2.5 to 25 parts lanthanum oxide ($La_2O_3$) or uranium oxide ($UO_2$) on a molar basis. The preferred range is 30 to 70 parts for the nickel oxide, 15 to 50 parts nickel chromite and 7 to 17 parts of lanthanum or uranium oxides.

When the catalyst contains lanthanum, the ratio of nickel to lanthanum can be varied to any value with the limitation that the ratio of nickel to lanthanum must exceed 2. A ratio of exactly 2 produces a satisfactory catalyst but it is inferior to that which has excess nickel oxide above that stoichiometrically reactive with lanthanum to form $La_2NiO_4$.

The catalyst of the invention is effective for steam-hydrocarbon reforming. When this catalyst is used, the tendency for carbon deposition even under very adverse conditions is low. Furthermore, the catalyst is effective at low operating temperatures and even under these conditions resists the formation of elemental carbon with resultant disintegration of the catalyst.

DETAILED DESCRIPTION OF THE INVENTION

The catalyst of the invention is a nickel oxide-nickel chromite catalyst stabilized with lanthanum oxide or uranium oxide, and optionally containing a co-promoter such as cerium oxide, manganese oxide or the rare earth oxides.

The amount of nickel oxide in the catalyst will vary between 10 and 100 parts on a molar basis. The amount of nickel chromite will vary between 5 and 100 parts. It should be pointed out that although nickel chromite is considered to be the compound, $Ni_2Cr_2O_5$, it is also considered to be a mixture $NiO \cdot NiCr_2O_4$. The NiO of such a mixture is neglected in computing the ratios set forth in this description.

The amount of stabilizer present will vary between 2.5 and 25 parts. When lanthanum is used as a stabilizer, the ratio of nickel to lanthanum must exceed 2.

The co-promoter, when present, will range from 1 to 100 parts. The co-promoter can be any of the following materials: the oxides of cerium, magnesium, manganese, molybdenum, tungsten, niobium, tantalum or other rare earths or the mixtures thereof.

The catalyst of the invention can be unsupported or supported. If supported, conventional catalyst supports can be used, i.e. any refractory oxide melting above 1500° C. or a suitable metallic support, i.e. various metals or their alloys. Suitable supports include alumina, e.g. alpha alumina, chromium oxide, mullite, thorium oxide, spinel, silica, silica-alumina, bauxite, magnesia, stainless steel, steel or nickel alloys with aluminum, thorium, chromium or iron. However, it should be kept in mind that silica ordinarily is considered harmful and should be avoided when the reforming operation is performed at high temperatures and high pressures. Under such conditions the silica may mobilize and move from the support material to a cooler position downstream where it may deposit harmfully on heat exchanger or other surfaces. Usually for the most effective support, the support should have a roughened surface to provide an effective anchor for the catalytic material and macropores of 0.5 to 25 microns in diameter to provide a location for the catalytic material such that catalysis can occur within the support structure.

The catalysts of the invention can be made by conventional techniques. Thus the catalyst can be made by impregnating a refractory support with a solution or slurry of the catalytic active ingredients, i.e. the nickel, nickel chromite or their precursors and the stabilizer and then calcining to activate. The temperature of calcining is not critical and can vary from 400° C. to 1200° C.

A supported catalyst can also be made by adding a cement to the catalytically active materials and cementing them to the support. Useful cements include Sorel cement, calcium aluminate, alumina gel, colloidal alumina, and the like. The materials should be used in quantities such that they comprise less than 10% of the solids content of the composition applied to the support.

Alternatively, the catalysts can be made by co-precipitation of the catalytic components, with or without the support materials. The co-precipitation is brought about by preparing a solution of the catalytic components and then adding a precipitating agent to the solution, e.g. ammonium carbonate, ammonia, and the like. The precipitated product can be mixed with a suitable adhesive, i.e. nickel nitrate, colloidal silica sol, alumina gel, colloidal boehmite and optionally a cement and then pilled or extruded into the desired form. This form can vary widely and will usually be in the shape of cylinders, rings, rods, tubes, saddles, etc. The examples illustrate these conventional techniques when used to make the catalysts of the invention.

With regard to putting the catalytic components onto the support, it is desirable that little or none of the nickel and other active ingredients appears below the surface of the support in very fine pores. If they do migrate below the surface into pores much below 0.5 micron in diameter, the tendency for carbon deposition and spalling of the catalyst may be enhanced. It appears also that the quantity and type of binding cement used as adhesive for the exterior coating of the support is critical. Calcium aluminate appears to be the preferred cement but it must be used in quantities less than 10% of the solids content of the coating mixture. The pore size and pore volume of the support also is critical; pore volume should be in the range of 0.10 to 0.55 ml./gram and pores should be in the range of 0.5 to 25 microns in diameter. Smaller pores can cause disintegration as described above.

The procedure used to coat the support is preferably one which minimizes the migration of the catalytic material, such as nickel into small pores below 0.5 micron in diameter. To achieve this, in addition to carefully selecting the support, the operation can be performed by first heating the support material in such a way that it is close to the point at which the rate of evaporation of the vehicle containing the catalytic materials will be just short of the rate at which the slurry or solution reaches the surface of the support.

When a metallic support is used to make the catalyst of the invention, it usually is necessary to roughen the surface to provide an anchor for the catalytic materials. For example, the metallic support can be etched with an acid, i.e., nitric acid, nitric acid and acetic acid, or with bromine in methanol or ferric chloride in ethanol. Any material which will etch the non-nickel surface to form a rough surface will suffice as long as it does not leave a harmful residue.

After the support surface has been roughened, it is impregnated with a suitable source of nickel and nickel chromite in solution or as a slurry-solution where one component is in solution and the other in suspension. Usually the stabilizer will also be applied to the surface at this time, although it can be applied subsequently. The nickel solutions can be such materials as nitrates, carbonates, and acetates which will decompose to nickel oxide on heating. For example, the etched wire can be dipped in a solution of nickel nitrate hexahydrate and then fired at 400° C. for two hours and then redipped and fired at 800° C. for one hour. The concentrations of the impregnating material will usually be about 1 to 3 molar. Redipping and firing at 900° C. may be carried out as many times as necessary to obtain the desired added nickel.

Other methods of applying the nickel can be used, thus the methods of U.S. Pat. 3,460,523 can be used.

In an alternative embodiment, a pure nickel support can be etched with dilute nitric acid, nitric and acetic acid, bromine or ferric chloride, or other materials to obtain a rough, oxide surface, usually 10 seconds to 10 minutes is required. The etchants can be nitric acid nitric-acetic acid, bromine in methanol, or ferric chloride in ethanol. The nickel support can then be coated with the nickel chromite-stabilizer and optionally additional nickel in the same manner set forth above for non-nickel support and calcined.

Suitable sources of nickel for making the catalyst of the invention are nickel oxide or the soluble salts of nickel, e.g. nickel nitrate, nickel chloride, nickel sulfate, nickel acetate, nickel formate, and the like.

The nickel chromite for making the catalyst of the invention is prepared by procedures known in the art. One procedure is to agitate a solution at 30° C. containing nickel nitrate and chromic acid anhydride ($CrO_3$) on a one molar basis (i.e. 1 gram mole of each per 2 liters of solution) and then pass anhydrous ammonia into the solution at a rate sufficient to complete precipitation (ca. pH 6.9) in 60 to 90 minutes. Thereafter, the slurry is agitated for one hour, the slurry is filtered, the filter cake is washed to remove soluble salts. Next the filter cake is dried and then calcined at 450° C. for two hours. The resultant powder is nickel chromite.

When the catalyst of the invention is an etched nickel wire impregnated with the other components, the catalyst is then charged into a heater, e.g., the reformer, where it is heated in air at 300° to 1200° C. for sufficient time to convert the surface nickel to nickel oxide. The time depends upon the temperature, thus 90 minutes is sufficient at 1100° C., while several hours will be required at the lower temperatures.

The stabilizers can be incorporated into the catalysts of the invention by conventional techniques, e.g. impregnation using soluble salts of the agents. Thus nitrates, chlorides acetates, sulfates and the like of lanthanum and uranium can be placed in solution and combined with the soluble nickel and nickel chromite compounds. Or if desired, a stabilizer precursor in solution or as a slurry can be added to a preferred nickel oxide-nickel chromite catalyst composite.

The optional co-promoters can be incorporated into the catalysts in the same manner, i.e. from soluble salts, such as nitrates, acetates, sulfates, chlorides, formates or colloidal dispersions.

Although economically it is not the preferred method of fabrication of the catalyst, the catalyst can be prepared as a pure compound without being placed on a support and can be pelleted with or without cement binders or it can be coprecipitated with alumina or aluminum hydroxide which would be precursors of finely divided alpha-alumina which would appear as such intermixed with the active catalytic ingredients in the final catalyst forms. Such methods of preparation are known in the art and can be performed, for example, by adding aluminum hydroxide in required quantities.

The catalyst of the invention is useful in the reforming of hydrocarbons in the presence at the minimum quantities of steam without causing carbon deposition; thus satisfactory performance can be obtained with just 10% excess steam over the stoichiometric required for the carbon content of the hydrocarbon. They are particularly useful in the steam reforming of methane, natural gas and naphtha. The operation of the reformers is well known to those skilled in the art. Accordingly, this process will not be described in detail. It will suffice to say that the catalysts of the invention are to be used in the well known reforming process and will result in the advantages previously set forth.

The following examples are offered to illustrate various embodiments of the catalysts of the invention.

EXAMPLE 1

(1) A solution is prepared consisting of 43 parts by weight of lanthanum trinitrate hexahydrate and 290 parts by weight of nickel dinitrate hexahydrate in 2000 parts by weight of distilled water.

(2) To this solution is added 20 parts by weight of nickel chromite made in the following manner.

A solution is prepared by dissolving in 2000 parts by weight of distilled water, 100 parts by weight of chromic acid anhydride ($CrO_3$) and 290 parts of nickel nitrate hexahydrate.

This solution is heated to 40° C., then vaporized anhydrous ammonia is added to the solution while it is being rapidly agitated until a pH of 6.9 has been reached.

The slurry thus produced is filtered, the filter cake is dried and the dried filter cake is finally calcined at 450° C. for 2 hours. This operation converts the basic nickel chromate precipitate to nickel chromite. Simultaneously, the chromium complex is reduced from the hexavalent state to the trivalent state.

(3) The solution is heated to 85° C., is rapidly agitated and 10% ammonium bicarbonate solution is added, maintaining the temperature at 85° C., over a period of time of approximately 30 minutes until a pH of 6.8 has been reached. Agitation is continued for 60 minutes at 85° C., then the slurry is filtered, the filter cake washed with 2000 parts of distilled water, then is dried at 150° C. for 12 hours and finally is calcined at 400° C. for 2 hours.

(4) 20 parts by weight of the calcined powder obtained in Item 3 is slurried in a solution comprising 100 parts by weight of distilled water and 29 parts by weight of nickel nitrate hexahydrate.

(5) Alpha-alumina in the form of 1/8" x 1/8" cylinders and having a porosity of 43%, the pores in the range of 0.5 to 20 microns in diameter, and a surface area of 0.4 m.$^2$/g. and amounting to 200 parts by weight is placed in a suitably sized evaporating dish, heated to 80° C. and the solution-slurry made in Item 4 is poured over the alpha-alumina particles and is evaporated to dryness at 110° C. while being stirred to assure uniform deposition of the catalytic materials throughout and on the surfaces of the porous support.

(6) The coated cylinders derived in Item 5 are heated to 1000° C. in an oxidizing environment for 3 hours.

The material thus produced is a very active catalyst for methane-steam conversion to carbon monoxide, hydrogen and carbon dioxide. The catalyst has a very low tendency for carbon deposition even under adverse conditions of low steam to carbon ratio and when long chain, heavy hydrocarbons are fed to the catalytic system. For example, two catalysts of commerce completely disintegrated under these tests, whereas the catalyst of Example 1, tested under similar conditions of carbon deposition, showed no disintegration.

EXAMPLE 2

(1) The procedure of Example 1 is followed with the exception that in addition to the nickel nitrate-nickel chromite and lanthanum nitrates used in Instructions 1 and 2, there was also used 43 parts by weight of cerium trinitrate hexahydrate. The remaining operations of Example 1 are performed as described under Example 1.

Instead of the 43 parts by weight of cerium nitrate, there can be used a stoichiometrically equivalent quantity of mixed rare earth nitrates of the type available in commerce. They are identified as mixed rare earth salts and are obtained as an inexpensive mixed product from the recovery of the rare earth values from monazite or bastnaesite ores.

Instead of the cerium nitrate as stipulated above, there can be used a stoichiometric equivalent of manganese nitrate to replace the cerium nitrate.

EXAMPLE 3

The procedure of Example 1 is followed with the exception that instead of using lanthanum nitrate a stoichiometrically equivalent quantity of uranyl nitrate is used. The formula for uranyl nitrate is $UO_2(NO_3)_2 \cdot 6H_2O$. The catalyst thus produced is effective for the reforming of steam and hydrocarbons on steam, carbon dioxide and hydrocarbons.

EXAMPLE 4

A solution is prepared comprising 2000 parts by weight of water, 33 parts by weight of lanthanum nitrate of the type used in Example 1, 77 parts by weight of nickel nitrate also of the type used in Example 1 and 5 parts of nickel chromite of the type used in Example 1. This solution is precipitated and the precipitate processed as described for Example 1. The ratio of nickel to lanthanum in this case is 2.5:1, whereas it is 10:1 in Example 1. Both ratios produce catalysts which are effective for hydrocarbon steam reforming to produce synthesis gases without concomitant deposition of carbon such as is characteristic of typical catalysts of commerce.

I claim:

1. A stabilized nickel oxide reforming catalyst comprising 10 to 100 parts nickel oxide in combination with 5 to 100 parts nickel chromite and 2.5 to 25 parts of lanthanum oxide or uranium oxide, all parts being on a molar basis.

2. The catalyst of claim 1 supported on a refractory oxide melting above 1500° C.

3. The catalyst of claim 2 wherein the support is alpha alumina.

4. The catalyst of claim 1 containing in addition from 1 to 100 parts on a molar basis of co-promoter selected from the oxides of cerium, magnesium, manganese, molybdenum, tungsten, niobium, tantalum, the rare earths, or mixtures thereof.

5. The catalyst of claim 2 wherein the oxides have a pore size between 0.5 and 25 microns in diameter.

References Cited
UNITED STATES PATENTS

| | | | |
|---|---|---|---|
| 3,388,074 | 6/1968 | Reitmeier | 252—470 X |
| 3,421,871 | 1/1969 | Davies | 252—470 X |

DANIEL E. WYMAN, Primary Examiner

W. J. SHINE, Assistant Examiner

U.S. Cl. X.R.

252—458, 465, 470; 48—214; 252—471